United States Patent [19]

Heinz et al.

[11] 4,229,771

[45] Oct. 21, 1980

[54] METHOD OF RECORDING A CONTROL SIGNAL ADJACENT ANOTHER SIGNAL TRACK ON A MAGNETIC RECORDING MEDIUM, AND SYSTEM THEREFOR

[75] Inventors: Richard Heinz, Pfungstadt; Bernd Heidel, Dieburg, both of Fed. Rep. of Germany

[73] Assignee: Robert Bosch GmbH, Stuttgart, Fed. Rep. of Germany

[21] Appl. No.: 968,729

[22] Filed: Dec. 12, 1978

[30] Foreign Application Priority Data

Jun. 24, 1978 [DE] Fed. Rep. of Germany ....... 2827826

[51] Int. Cl.³ .................... G11B 5/09; G11B 5/02
[52] U.S. Cl. ......................... 360/46; 360/40; 360/68
[58] Field of Search .............. 360/27, 28, 37, 55, 360/40, 39, 60, 51, 46, 61, 66, 68

[56] References Cited

U.S. PATENT DOCUMENTS

| 2,894,796 | 7/1959 | Reynolds | 360/68 |
|---|---|---|---|
| 3,530,257 | 9/1970 | Brown, Jr. | 360/68 |
| 3,571,526 | 3/1971 | Stockwell | 360/27 |
| 3,789,380 | 1/1974 | Cannon | 360/40 |
| 4,017,903 | 4/1977 | Chu | 360/40 |
| 4,133,010 | 1/1979 | Rossbach | 360/68 |

*Primary Examiner*—Vincent P. Canney
*Attorney, Agent, or Firm*—Frishauf, Holtz, Goodman & Woodward

[57] ABSTRACT

A magnetic recording medium, such as magnetic tape, a record carrier, or the like, has an audio track recorded thereon; immediately adjacent the audio track is a control track having major low frequency components. To reduce cross talk between the control track and the audio track, the control track is recorded in form of pulse pairs, in which the pulses are essentially square wave pulses and located immediately adjacent each other and have respective opposite polarity, the pulse pairs being spaced from each other by pulse gaps which are long with respect to the duration of individual pulses of the pair; the particular pulse pair arrangement results in a Fourier frequency distribution which has substantial amplitude level in higher frequency ranges which, due to the characteristics of the recording medium, are less subject to cross talk. To generate such pulse pairs, a differential amplifier can be used which, by a feedback connection, can be caused to function as an erase oscillator during the pauses between the pulse pairs, the oscillating feature being overridden during the pulse generation.

10 Claims, 11 Drawing Figures

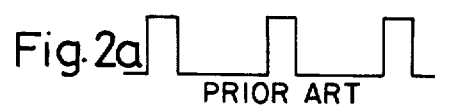 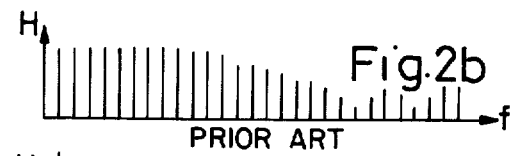
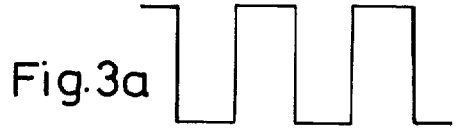 
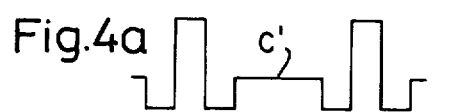 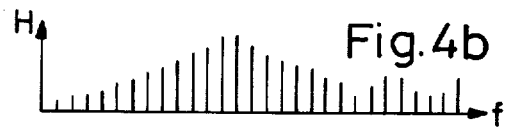
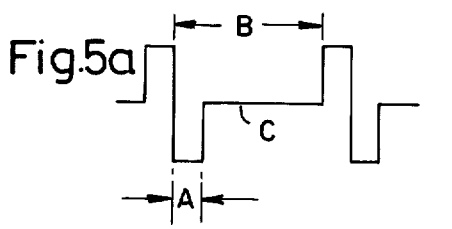 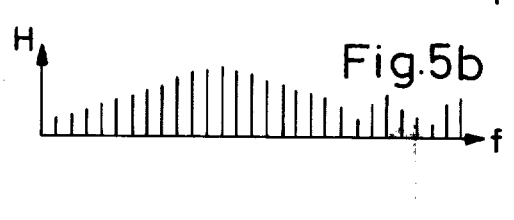
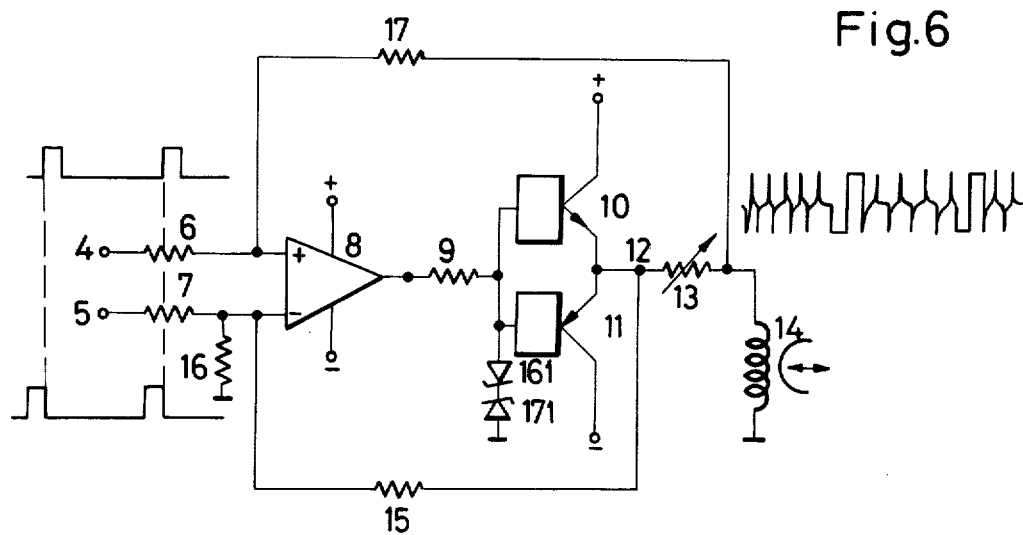

METHOD OF RECORDING A CONTROL SIGNAL ADJACENT ANOTHER SIGNAL TRACK ON A MAGNETIC RECORDING MEDIUM, AND SYSTEM THEREFOR

The present invention relates to a method and a system of magnetic recording, and more particularly to magnetic recording of video signals on magnetic tape.

BACKGROUND AND PRIOR ART

Video tape recording signals which are recorded on a tape usually include, besides the video information, several longitudinal tracks which have the audio portion of the program recorded thereon and, in addition, include control signals on the track itself to ensure proper synchronous operating of the video reproducing apparatus with respect to the recording of the information on the tape. The speed of operation of the tape has to be accurately controlled, and the tape itself must carry data which are available to control its speed and, if desired, additionally the speed of a rotating scanner head carrying magnetic tape transducer heads. Many types of video tape recording systems use inclined tracks to carry the video data. These tracks are read by passing the tape in a spiral path over a scanning cylinder within which the scanner heads rotate. The video tracks, thus, are inclined with respect to the longitudinal direction of the tape. In addition to these inclined video tracks, the tape carries longitudinal tracks. One of the longitudinal tracks carries control signals to control the speed of operation of the tape and of the scanner heads. The control signals recorded on this control track usually are square wave pulses with a low duty cycle, in the form of changes of polarity with a usual change in amplitude of 1:1, up to saturation of the magnetic tape. The frequency of these pulses depends on the type of standard TV system being used, and on the type and quality of the magnetic tape, for example.

It is customary to record on one of the inclined video tracks the information contained in about fifty scanning lines of a video-type of reproducer. Such recording of about fifty lines requires a control signal in form of a square wave pulse of 312.5 Hz. In addition, the control track may carry pulses of one-fourth of vertical frequency to form edit pulses; such edit pulses occur in the PAL system at 12.5 Hz, or at 15 Hz in the NTSC system.

The audio information, which may be in the form of stereo audio, is located in a longitudinal track immediately adjacent the control track. Since the space available for the tracks on the tape is limited, the audio track and the control track are close to each other. Some cross talk between the tracks will result. This cross talk is particularly annoying with respect to the audio tracks since low frequencies cause more cross talk than high frequencies. This phenomenon has been discussed in the literature—see Krones: "Die Theorie des Magnetspeichers" in Winckel: "Technik der Magnetspeicher" ("Theory of Magnetic Storage: Technology of Magnetic Storage"), published by Springer, 1960, page 398.

To effect erasing, and particularly erasing of the data on the control track, it has been customary to provide a separate erase signal generator, generating a frequency, for example of 30 kHz, that is, in the supersonic range, which is applied to a separate erase head, or to utilize a combined record/reproduce transducer head.

THE INVENTION

It is an object to provide a method for magnetic recording, and particularly for video tape recording, in which square wave signals recorded on a control track are so recorded that their interference, by cross talk, with adjacent tracks carrying other information, for example audio, is less than in the prior art and of such low amplitude so as to be essentially negligible; and to provide an apparatus capable of carrying out the method which is simple, requires few electronic components, and additionally can generate erase signals.

Briefly, the control signals are recorded in the form of pulse pairs of square wave form, in which the essentially square wave pulses of the pair are immediately adjacent each other and are of opposite polarity. The Fourier frequency spectrum of such pulses will show that higher frequencies form a substantial component of such pulses and, due to the nature of the tape and cross talk characteristics thereof, are thus substantially more attenuated with respect to their cross talk effect than lower frequencies. These pulse pairs are spaced from each other by pulse gaps. The energy content of immediately adjacent pulses of the pair are essentially the same. The first one of the pulses of the pairs can be generated to have half amplitude with respect to the next adjacent of opposite polarity, to be followed by a third pulse of the first polarity, and again of half amplitude, so that the pulse pairs are constituted actually by three pulses, of which the first and third have the same polarity but are of half amplitude, each, with respect to the intervening one. The Fourier distribution of such a pulse will be essentially the same as that of two immediately adjacent pulses of opposite polarity and essentially equal amplitude.

Apparatus to generate pulses of this type can readily be constructed by applying pulses which are time-shifted by the width of each one of them to a difference amplifier which, then, will provide output pulses of opposite polarity, immediately adjacent each other and also of opposite polarity. By including a feedback circuit with the difference amplifier, the difference amplifier can be caused to act as an oscillator in the period when no pulses are being applied, by self-oscillating at a frequency of, for example, 30 kHz, to form an erase signal being applied to the control track in the time interval of the gaps between the actual pulses of the pulse pairs. When the difference amplifier is controlled to generate the pulses, its self-oscillation is interrupted as long as the pulses are present at its inputs.

The system and method of recording substantially decreases the cross talk between an audio track and an adjacent control track on a magnetic recording medium, which may be a rotating record, but typically is a tape. The improvement in cross talk and noise level of a track adjacent the control track is based on the lower amplitudes of the lower frequencies of the control signal, that is, in the frequency range in which tapes and other magnetic recording media are particularly affected by cross talk.

The method and system additionally permits, in a simple manner, the recording of control pulses on a standard track already provided in standard video tape recording (VTR) systems, and permits erasing of previous control signals without requiring any special erase transducers or erase signal generators. This method and system thus also prevents cross talk between combined scanner heads due to the small distance of the coils for erasing and recording/reproduction over the gap of the erase portion; undesired signals due to such cross talk are therefore avoided.

Drawings, illustrating the method and a preferred example of the system:

FIG. 2a shows a pulse arrangement used on a control track in accordance with the prior art;

FIG. 2b is a frequency spectrum of the pulses of FIG. 2a;

FIG. 3a shows symmetrical rectangle pulses; and

FIG. 3b is the frequency spectrum of the pulses of FIG. 3a;

FIG. 4a is a pulse diagram of one form of pulses in accordance with the present invention; and FIG. 4b is the frequency spectrum thereof;

FIG. 5a is a pulse diagram of pulses in accordance with another, and preferred feature in accordance with the present invention; and FIG. 5b is its frequency distribution spectrum; and FIG. 6 is a general circuit diagram for generating the pulses in accordance with the diagrams of FIGS. 5a and 5b.

Figure 1A:
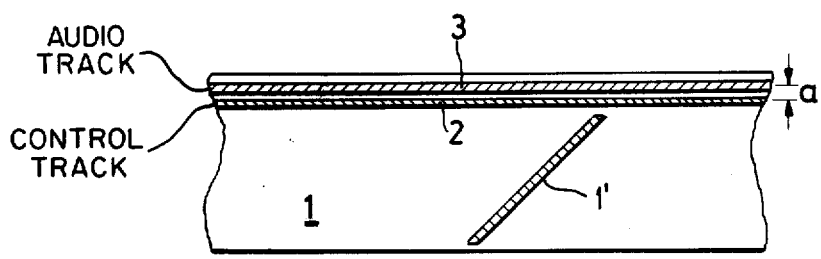
FIG. 1a is a highly schematic top view of track arrangements on a magnetic tape, arranged for VTR.

The present invention is particularly applicable to video tape recording (VTR) apparatus in which video signals are recorded on inclined tracks 1' on the main portion of magnetic tape 1 (FIG. 1a). A control track 2 is recorded on the tape, and, spaced therefrom by a small distance a, is an audio track 3. Further tracks, for example the other video tracks themselves, other audio tracks (for example for stereo reproduction, foreign-language audio, and the like) have been omitted from FIG. 1a for clarity and since they form no part of the present invention. The distance a is taken between the center lines of the respective tracks.

Figure 1B:
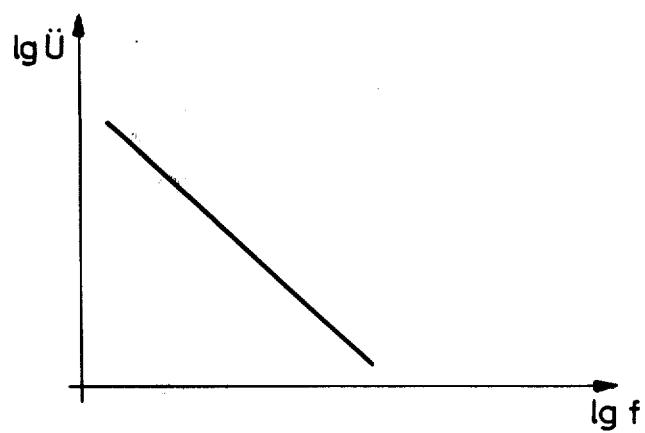
FIG. 1b illustrates the frequency-cross talk voltage distribution, in which frequency is shown on a logarithmic scale on the abscissa, and cross talk voltage U on a logarithmic scale on the ordinate.

The frequency-cross talk relationship between adjacent tracks is shown in FIG. 1b, in double-logarithmic scale. As will be clearly apparent, the flow frequency components have a substantially higher effect on cross talk than higher frequency components. The present invention is based on the utilization of this relationship, and the realization that the control signals should be so arranged or so changed that their low frequency components are kept to a minimum.

The usual type of control signals recorded on the control track 2, in accordance with the prior art, are shown in FIG. 2a, and their frequency distribution in FIG. 2b. As is clearly apparent, the portion of the base or first harmonic frequency of the pulses of FIG. 2a is substantial. Applying the analysis of FIG. 2b to the characteristics illustrated in FIG. 1b, it will be apparent that the tendency of cross talk between a control track and an adjacent track with pulses as in FIG. 2a is substantial. The cross talk noise level, and the disturbance to the audio track 3 thus is substantial. It can be reduced only by increasing the spacing between the control tracks which is undesirable in many applications, and impossible in most.

Another form of control track signals is illustrated in FIG. 3a, in which the pulses are recorded in symmetrical rectangle pulse form. The low frequency component of such pulses, as is clearly apparent from FIG. 3b, is even greater than those of the pulses of FIG. 2a. The fundamental or first harmonic frequency is particularly pronounced in this signal in accordance with FIG. 3a.

In accordance with the present invention, signals as shown in FIG. 4a and 5a are used. The signal of FIG. 5a is particularly preferred since it is simple to generate. As is apparent from the frequency spectra illustrated in FIGS. 4b and 5b, the fundamental of first harmonic is low, and the frequency distribution increases substantially towards the higher frequencies. Thus, the desirable characteristics as illustrated in FIG. 1b, of having higher frequencies appear, to reduce cross talk, are met.

The signal of FIG. 5a has a much lower signal-to-noise ratio than the previously used control signals, typically the signal of FIG. 2a. The erase head system can additionally use inductive coupled recording to effectively reduce the physical distance between the magnetic field which corresponds to the control track pulses and the audio track 3, or tracks, if more than one audio track is used.

The unfavorable frequency distribution of the prior art control pulses of FIG. 2a tends to emphasize an energy distribution of 37.5 Hz, 50 Hz and 312.5 Hz in the PAL system—corresponding to 30 Hz, 45 Hz, 60 Hz and 315 Hz in the NTSC system. In contrast, a control signal as illustrated in FIG. 5a, has a much more favorable energy distribution characteristic, and permits suppression of the unfavorable energy distribution by 20 dB or more. The total signal-to-noise ratio can be improved by 6 dB if no other disturbances occur.

A 30 kHz erase voltage can be inserted between the pulses on the control track, as will appear in connection with the discussion of FIG. 6. No separate erasure head or erase system in addition to the control track erase head on the scanner is necessary. This, then, ensures that the originally planned physical distance between the audio track 3, or tracks, and the control track 2 can be maintained.

In an operating example, the pulse width A of the pulses of FIG. 4a, FIG. 5a is about 130 microseconds, with a tolerance of about ±10 microseconds. The repetion rate or recurrence rate, indicated by the distance B between pulses, is determined by the type of recording and may, for example, be in the order of fifty lines of video reproduction. The length in time C then is the time difference between the number of lines recorded on one inclined video information track 1' (only one shown in FIG. 1a, for clarity) and 260 microseconds. This distance is somewhat less in the pulse distribution of FIG. 4a, wherein the length of the gap C' is the time to record the predetermined number of lines on the inclined track 1' and 390 microseconds—plus tolerance. Edit pulses, of the same wave shape as the respective control pulses as illustrated in FIGS. 4a, 5a can additionally be interposed between the control pulses at a desirable repetition rate, for example four times for each vertical frame.

FIG. 6, Circuit: Two pulses, time-shifted with respect to each other by a pulse width A, are applied to input terminals 4, 5 and coupled through coupling resistors 6, 7 to respective direct and inverting inputs of a differential amplifier, typically an operational amplifier. The output of the differential amplifier 8 then will provide pulses as seen in FIG. 5a. These output pulses are coupled over a resistor 9 to an output stage having two transistors 10, 11. The amplification of the amplifier 8 is controlled by feedback circuit 15 and by resistor 16. The output 12 of the power stage is connected through a coupling resistor 13 which, preferably, is adjustable to permit calibration to a magnetic record/reproducer head 14, shown schematically only. The output resistance of the amplifier circuit, the resistor 13, and the coil 14 of the transducer form an oscillatory circuit which is coupled by positive feedback resistors 17 to the direct input of operational amplifier 8. Feedback resistor 17 thus closes an oscillatory loop which will be effective during the gaps between pulses when the inputs of the differential amplifier 8 are both at zero potential, and cause the overall system to oscillate. The value of resistance 13 can be adjusted to control both the amplitude as well as the frequency of oscillation of the oscillatory system formed by amplifier 8, the associated circuit 9, 10, 11 and resistor 13 and coil 14. The so generated oscillations, when recorded on the tape by transducer head 14, can completely erase any previously recorded data thereon. If a pulse is applied to terminals 4, 5, respectively, the oscillation is interrupted.

To obtain the frequency distribution or frequency spectrum desirable for minimum cross talk, symmetry of the pulses in the positive and negative amplitude regions should be maintained as close as possible and exact symmetry is highly desirable. No d-c offset should be present. This exact symmetry can be obtained by use of two Zener diodes 161, 171 connected to the bases of the transistors 10, 11 to provide for exact symmetrical operation of the transistors 10, 11 so that at the common emitter junction 12 thereof there will be exactly symmetrical output pulses. The Zener diodes 161, 171 should be of superior quality and very low tolerance.

The system and method in accordance with the present invention is not limited to the recording of control tracks of VTR tape; it can be used with any type of pulse recording, for example to record time code pulses on other types of record carriers. The system and method likewise is not limited to tape itself, but can be used with rotating disk-type records, and the like as well.

Various changes and modifications may be made within the scope of the inventive concept.

In a typical example, amplifier 8 was an operational amplifier of the type CA 3100S, coupling resistor 9 then will have a value of 390 Ohms, resistor 13 220—320 Ohms, and resistor 17 39 kOhms, resulting in an erase frequency of 30 kHz in the time interval C, FIG. 5a.

We claim:

1. In a method of recording electrical pulse-type control signals on a track of a magnetic recording medium, in which at least one other signal is recorded in a track parallel to the control track carrying said control signals, a method to reduce cross talk between the control signals and said adjacent track which comprises
    recording the control signals in form of pulse pairs of essentially square wave pulses, in which the pulses of the pairs are immediately adjacent and have respectively opposite polarity, and the pulse pairs are spaced from each other by pulse gaps which are long with respect to the duration of the individual pulses of the pair to provide control signals which have, in Fourier distribution, a frequency spectrum in which frequencies higher than said control signals form a substantial component of the signal whereby crosstalk between the control signals and said adjacent track is reduced.

2. Method according to claim 1, wherein, during the pulse gaps, no signal is being recorded on said control track.

3. Method according to claim 1, wherein the control signals are applied to the tape by a transducing head (14), including the step of
    applying, during the pulse gaps, to the transducing head an additional signal having a frequency high with respect to the frequency of the pulses recorded on said control track.

4. Method according to claim 3, wherein said additional signal is an erase signal to erase signals previously appearing on the control track.

5. Method according to claim 1, wherein the pulses of said pair of pulses are of essentially the same energy content.

6. Method according to claim 1, wherein said pulses of the pair are of essentially the same amplitude.

7. Method according to claim 1, wherein (FIGS. 4a, 4b) one of said pulses is about half the amplitude of the immediately adjacent pulse of opposite polarity;
    and a further pulse of the essentially same amplitude and the same polarity as said first half-amplitude pulse is immediately following the next adjacent pulse to obtain the effect of a pulse of the energy content of said pulse having said amplitude with immediately preceding and succeeding pulses of half the energy content, each, and half amplitude, so that the overall energy distribution of the pulses of any one polarity is essentially the same.

8. Apparatus for recording an electrical control signal on a control track of a magnetic recording medium, in which at least one other signal is recorded on a track immediately adjacent said control track, and said control signal comprises square wave pulses,
    comprising
    a difference amplifier (8) having succeeding pulses applied to respectively different polarity inputs, the difference amplifier being connected to a circuit including reactive impedance;
    and a positive feedback circuit (17) from the output of the difference amplifier to its input to provide an oscillatory circuit, the difference amplifier oscillating in the time period of said pulse gaps and between the occurrence of the pulses being applied thereto.

9. Apparatus according to claim 8, wherein said difference amplifier is connected to a magnetic recording transducer head, said recording transducer head providing inductive impedance and, together with said amplifier, forming an oscillatory circuit to provide for self-oscillation of the circuit in the absence of said pulses applied to the input thereto.

10. Apparatus according to claim 9, wherein the frequency of oscillation of said oscillatory circuit is set to provide a magnetic erase signal in the order of about 30 kHz.

* * * * *